INVENTORS
RONALD A. DELANEY
JESSE J. WILLIAMS JR.
BY Joseph L. Spiegel
ATTORNEY

United States Patent Office 3,444,501

Patented May 13, 1969

3,444,501

THERMISTOR AND METHOD OF FABRICATION

Ronald A. Delaney, Wappingers Falls, N.Y., and Jesse J. Williams, Jr., Santa Monica, Calif., assignors to International Business Machines Corporation, Armonk, N.Y., a corporation of New York Filed May 16, 1966, Ser. No. 550,229

Int. Cl. H01c *7/04, 17/00;* H01b *1/02*

U.S. Cl. 338—22 10 Claims

ABSTRACT OF THE DISCLOSURE

Thermistors are formed by mixing cobalt oxide powder and an inert liquid vehicle, applying the mixture in paste form to a ceramic dielectric, firing at a temperature between 1,250–1,350° C., and preferably 1,275–1,325° C., to form a thermistor element consisting of cobaltic oxide $Co_3O_4$ having an amorphous surface and, after cooling, applying electrodes to complete the thermistor. Dopants may be mixed with the cobalt oxide powder, prior to dispersal in the vehicle, to raise or lower resistivity of the resulting thermistor.

This invention relates to thermistor elements, electronic microminiature temperature sensing devices and methods of fabrication.

Thermistors are useful in many diverse applications where it is either necessary or desirable to measure or control temperature. One such application would be in connection with the microminiaturized circuit module of the type described on pp. 102–14 of the IBM Journal of Research and Development (April 1964). The thermistor serves as a warning device to detect undesired high temperatures within the module region that would damage one or more of the functional components of the module.

Typically, a microminiaturized circuit module is a one-half inch square substrate of only a fraction of an inch in thickness, having functional components on its surface electrically connected with printed wiring. The functional components are devices which include one or more active or passive electric circuit elements fabricated as an integrated structure and capable of performing useful functions or operations. The active devices, as one example, secured to the substrate are generally on the order of 25 x 25 to 300 x 300 mils. The printed conductive elements or wiring between the active and passive devices are in width 5 to 15 mils or less and in thickness 0.5 to 1.5 mils.

Prior art thermistor fabrication techniques are characterized by the provision of granular particles of one or more of the oxides of manganese, nickel, cobalt, copper, iron or zinc, thoroughly mixed with a binder and solvent to form a thermistor paste. An electrode paste composed of thermistor material and a noble metal is formed in a similar fashion. In forming a thermistor a very thin film of the electrode paste is spread out on an optical glass and dried. A film of thermistor paste is then spread on top of the electrode film. When the thermistor film is dried a third thin film of electrode paste is smeared over the thermistor film and dried. The composite is then removed from the flat and cut into the desired shape and size of flakes. Each flake is then placed on a flat surface of refractory material and fired to remove the temporary binder and sinter the respective layers. After binder removal the temperature is raised rapidly to approximately 1,100° C. where most of the sintering takes place. Depending on the material from which the flakes are made the temperature may be further raised to some point between 1,100–1,450° C. to complete sintering. The flakes are then cooled and mounted on a thermally conductive supporting structure which serves as a heat sink. Alternatively, the fabrication steps are modified so that the composite comprises all metal film, metal-thermistor film, thermistor-film, metal thermistor film and all metal film. The thermistor is completed by soldering leads to the outer all metal layers. Because the flakes are very small and fragile, many flakes are inevitably broken in manufacture and handling.

In still other methods, a thermistor paste comprising a mixture of either 85% manganese oxide and 15% nickel oxide or 68% manganese oxide, 16% cobaltic oxide and 16% nickel oxide, with a vehicle is spread through a mask onto the smooth plane surface of a thermally-conductive, electrically insulating block. The block is placed in a furnace and fired at 1,150–1,250° C. until the thermistor material is sintered onto the block. Thereafter, electrodes are applied by printed circuit techniques.

Apart from the fact that they are quite expensive, these prior art thermistors have proved to be incompatible with the microminiature circuit modules. In the first place they are too bulky, that is, they require a disproportionately large amount of surface area on the circuit module substrate. Secondly, they do not readily lend themselves to mass production techniques. Others are moisture sensitive and/or have high levels of self heating giving rise to erroneous measurements. Response is linear only over a very short temperature range and drifts with time.

An object of the present invention is a thermistor element having good temperature sensitive properties.

Another object of the present invention is a simple and inexpensive method of fabricating thermistor elements.

A further object of the present invention is a thermistor which is compatible with microminiaturized circuit modules, and whose thermal response bears a simple exponential relationship to temperature and is highly reproducible, predictable and sensitive.

A still further object of the present invention is a simple and inexpensive method of fabricating thermistors.

These and other objects are accomplished in accordance with the present invention, one illustrative embodiment of which comprises providing a mixture including cobalt oxide powder and an inert liquid vehicle adapted to be deposited and fired on a supporting, thermally conductive ceramic dielectric substrate to form a thermistor element thereon. The mixture is applied in paste form to the dielectric, fired at a temperature between 1,250–1,350° C. to form the thermistor comprising cobaltic oxide having an amorphous surface. After cooling, electrodes are applied to complete the thermistor.

The foregoing and other objects, features and advantages of the invention will be apparent from the following more particular description of the preferred embodiments of the invention as illustrated in the accompanying drawings wherein.

Figures 1, 2:
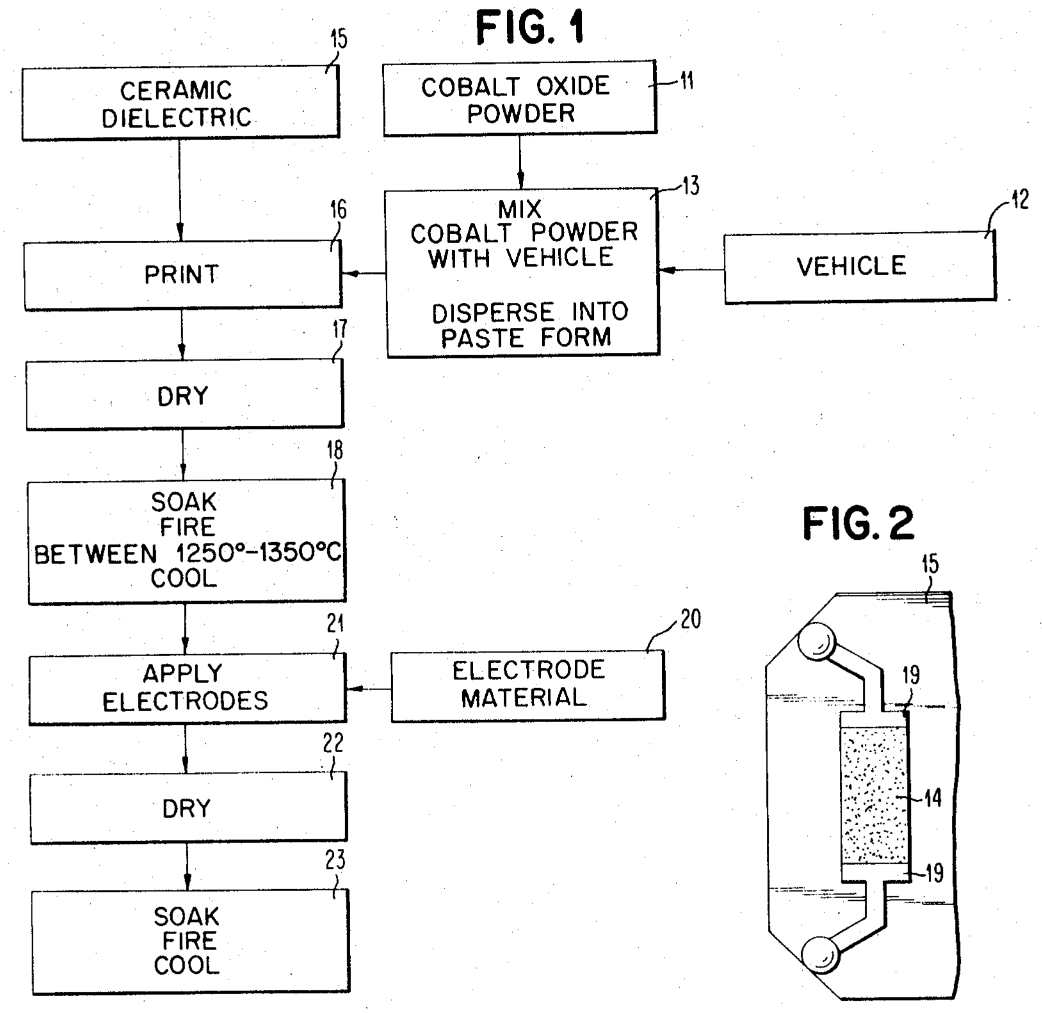
FIGURE 1 is a flow diagram illustrating the method required for fabricating the thermistor of the present invention.
FIGURE 2 is a plan illustration, broken away, of a microminiaturized circuit module with the novel thermistor of the present invention formed thereon.

Referring now to the flow diagram of FIGURE 1 there is shown a summary of the method of fabricating a thermistor such as shown on the module in FIGURE 2. Heterogeneous cobalt oxide powder 11 is obtained directly from commercially available sources, or in any well known manner such as by decomposing one of the Co salts, cobalt carbonate, cobalt acetate, etc. In several experiments cobalt carbonate was decomposed in air at 1,000° C. and this proved to be a completely satisfactory source of powder. The powder is now ready to be mixed with a vehicle 12.

The vehicle can be any suitable inert liquid which normally includes a vaporizable solid, a resinous binder and a solvent for the vaporizable solid and binder. The vaporizable solid in the vehicle results in dimensional stability of the printed line. Examples of applicable vaporizable solids are terepthalic acids, furoic acid and ammonium sulphate. The binder material is used to retain the powder on the dielectric when the solvent and a vaporizable solid have been removed. Examples of binders include natural gums, synthetic resins, cellulose resinous materials and the like. The solvent imparts the desired viscosity to the printing paste and is selected so that it will dissolve the binder and dissolve or disperse the vaporizable solid used in the vehicle. Commonly used solvents are the higher boiling paraffins, cycloparaffins and aromatic hydrocarbons or mixtures thereof; or one or more of the mono- and di-alkyl ethers of diethylene glycol or their derivatives such as diethylene glycol monobutyl ether acetate. The elements of the vehicle are premixed into solution before mixing with the cobalt oxide powder. In several experiments a vehicle of 94% beta-terpineol and 6% ethyl cellulose was used and this proved to be completely satisfactory.

The cobalt powder and vehicle are combined in a weight ratio that permits good screenability, typically, 70–75% powder to 30–25% vehicle and are thoroughly and homogeneously mixed until a paste of the desired viscosity is formed in the method step 13. Standard mixing apparatus may be used such as mortar and pestle, a blade type mixer or the like until the powder attains an agglomerate particle size on the order of 0.1 to 0.3 mils. Where large scale production is contemplated a milling step is normally required. In this instance, a three roll mill is preferably used to further disperse the oxide powder in the vehicle. The mill temperature should not be allowed to rise much above room temperature to avoid excess volatization of the vehicle. However, it should be pointed out that the paste, if kept in a closed container, has a long shelf life. The paste is removed from the mill and is now ready for application to the dielectric.

A thermistor element is printed onto the dielectric, such as the thermistor element pattern 14 on dielectric substrate 15 in FIGURE 2 by silk screening or other conventional printing processes as step 16. The substrate 15 is, course, thoroughly cleaned and free from grease or other extraneous material before printing is attempted. A silk screen having the desired pattern is placed over the clean substrate. The paste is squeegeed, doctor bladed or extruded onto the screen. Pressure is applied to spread the paste through the screen and onto the substrate. The pattern in the screen is reproduced at a thickness determined by a number of variables, for example, squeegee pressure and angle, paste viscosity, screen openings, mask thickness, etc. The screen is removed from the substrate and the printed paste composition is dried as indicated at step 17 at room temperature or above. Most of the liquid is thereby removed and the resulting printed pattern is a solid.

The firing step 18 includes a cycle of soaking, firing and cooling. The period during which the temperature of the printed paste on the substrate is gradually being increased to that of the firing temperature is called the soaking period. It is during the soaking period that the last traces of the solvent of the paste evaporate. Then, as the temperature increases, the vaporizable solid in the vehicle completely sublimes. Finally, the binder constituent is decomposed and substantially removed from the paste as gaseous combustion products. The powder fuses at the firing temperature to produce a durable fixed thermistor element pattern on the dielectric substrate. The dielectric substrate, having the fused pattern thereon, is then brought to room temperature.

Neither time of firing and cooling the thermistor composition, nor the environment in which these steps are carried out appear to be critical. For example, the composition can be fired from a few minutes to an hour or longer in air or an oxidizing atmosphere, and then slow cooled or quenched to room temperature. However, the temperature at which the composition is fired is an important parameter, and must be kept within certain limits in order to practice the present invention.

In accordance with the teachings of the present invention, when the firing temperature is between 1,250–1,350° C. and preferably 1,300° C., the heterogeneous cobalt material sinters to form a stable single phase polycrystalline $Co_3O_4$ composition.

Figure 3:
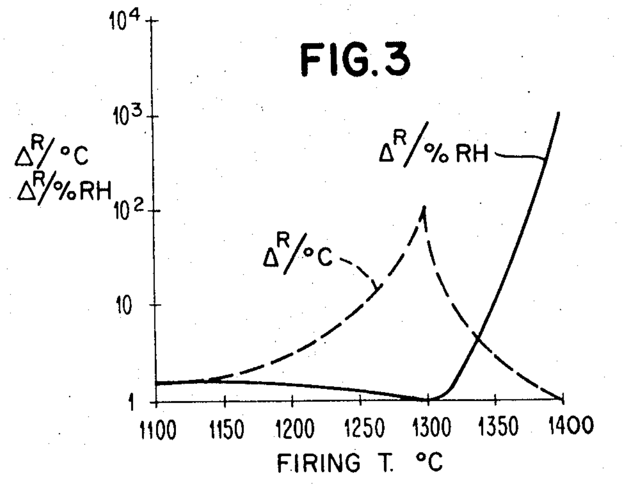
FIGURE 3 is a graphical illustration of the variations of thermal $\Delta R/°C.$ and humidity $\Delta R/\%RH$ coefficients of resistance with change in firing temperature of the starting material used.

Reference will now be had to FIGURE 3 which is a plot of firing temperature of the cobalt oxide powder vs. thermal coefficient of resistance (the solid line) and humidity coefficient of resistance (the dashed line). Powder that has been fired at 1,275–1,325° C. is extremely temperature dependent, reaching a peak at 1,300° C., while over the same temperature range it is insensitive to moisture. With 1,350° C. firing, the materials' temperature dependency has decreased significantly and now is far exceeded by its moisture sensitivity. At 1,400° C. the material is nearly completely temperature insensitive, while now extremely moisture sensitive. It should be mentioned here that by firing above 1,350° C., the material undergoes a phase change from temperature dependent single phase polycrystalline $Co_3O_4$ material having an amorphous surface, to moisture sensitive cobaltous oxide having an epitaxially grown highly crystalline surface.

At firing temperatures lower than 1,275° C., temperature dependency rapidly decreases and the material again becomes somewhat moisture sensitive. With 1,250° C. firing the materials' thermal coefficient of resistance (TCR) is approximately $\frac{1}{10}$ its value at 1,300° C., while its moisture sensitivity has increased somewhat. At 1,200° C. its moisture response is significant relative to its thermal response which has decreased further. Also, below this temperature the material becomes a two phase system of CoO and $Co_3O_4$.

To complete the thermistor, electrodes 19 (FIGURE 2) are applied to the thermistor element 14. Any metal such as platinum capable of conducting electricity can be used as the electrode material 20 and applied by silk screening or other conventional printing processes as step 21. After the drying step 22, the firing step 23 which includes firing at 800° C. for 20 minutes, and cooling to room temperature, complete the thermistor.

In operation, a voltage is applied between the electrodes, which are separated from one another by the thermistor element. When a change in ambient temperature takes place, a change in resistance takes place, the amount of change being dependent on the amount of temperature increase or decrease. The thermistor exhibits a simple exponential relationship with temperature as shown in the following graphs.

The resistance of a conductor is proportional to its length and inversely proportional to its cross sectional area.

$$R=\rho\frac{l}{tw}$$

R=resistance
ρ=resistivity
t=thickness
w=width
l=length

For a given resistive film of uniform thickness.

$$R \sim l/w$$

and if $$l = w$$

that is, if the film is a square, the resistance of the film remains constant regardless of the size of the film. In the following figures and explanation, a 1.0 square refers to a resistive film of uniform thickness where $l=w$, a 0.1 square is a film of uniform thickness where $$l = 0.1w$$

etc.

Figure 4:
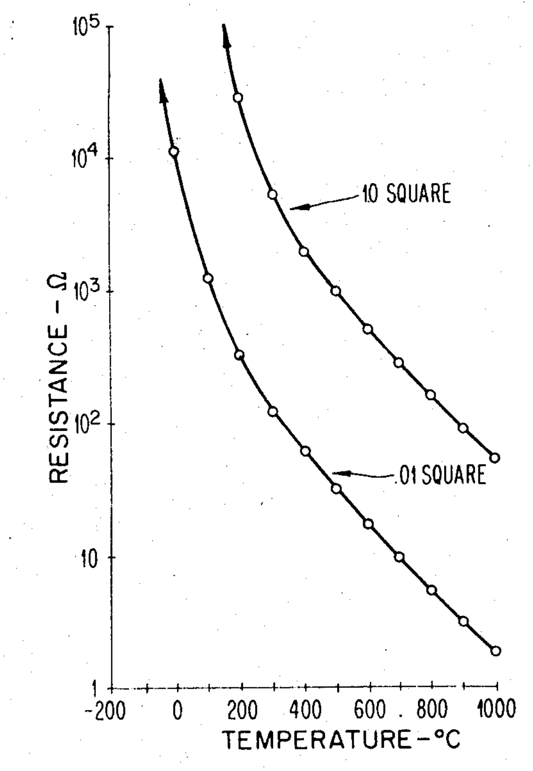
FIGURE 4 is a plot of resistance vs. ambient temperature of thermistors of different geometric configurations fabricated according to the invention.

Referring now to FIGURE 4, resistance vs. ambient temperature is plotted for thermistors of different dimensions, fabricated in accordance with the teachings of the present invention. A 1.0 square thermistor is shown to have completely linear response from 600–1,000° C. and fairly linear from 100–200° C. The response for the .01 square is linear from 300–1,000° C. and fairly linear from −20° C. to 100° C. In each case the thermistor had a uniform thickness of 25–30 microns. It will be appreciated that simply by varying the dimensions of the thermistor, one can provide a linear response over the temperature range to be monitored.

Figure 5:
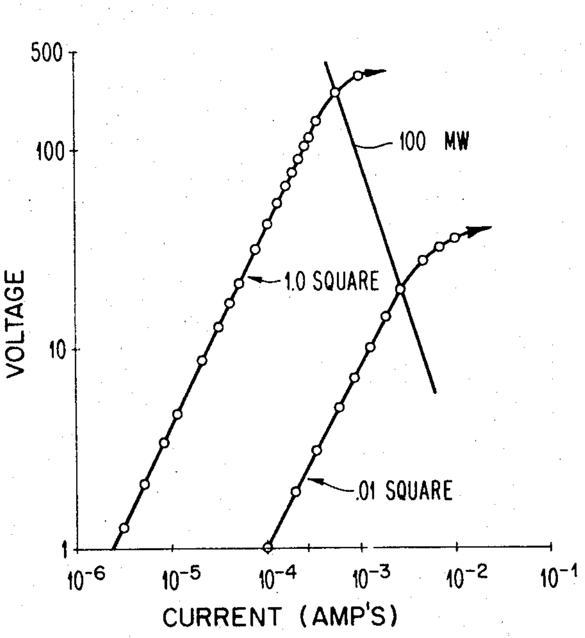
FIGURE 5 is a plot of voltage vs. current for thermistors of different geometric configurations fabricated according to the invention.

FIGURE 5 is a plot of voltage vs. current for thermistors of different dimensions fabricated in accordance with the teachings of the present invention. In either case, thermistor peak power is 100 milliwatts before self heating occurs and response becomes non-linear. Knowing the current and voltage ranges that will be used, one can select the dimensions of the thermistor such that self heating, which decreases resistance with no corresponding decrease in ambient temperature, will not occur.

The composition of the thermistor is modified by the addition of a dopant in amounts of 0.1 to 1.0 mol percent to produce a wide range of resistivities. If a dopant is to be added, the dopant is mixed with the cobalt oxide powder prior to dispersal in the vehicle in method step 13 until a homogeneous mixture is produced. The remaining fabrication steps are as previously described.

The dopants used for the thermistor may either lower or raise resistivity. Dopants which can be used to lower resistivity are monovalent metals such as lithium and silver. Dopants which can raise resistivity are ceramic fillers such as a ceramic composition more fully described in a copending application of Ronald A. Delaney and Richard K. Spielberger entitled "Ceramic Composition, Improved Electronic Devices Employing Same, and Method of Fabrication," Ser. No. 549,990, filed May 13, 1966 and assigned to the same assignee as the present invention which comprises a ceramic component including 50–60 mol percent $PbZrO_3$ and 50–40 mol percent $PbTiO_3$ and a vitreous frit component constituting 30 to 60%, by weight, of said composition. Other dopants which can raise resistivity are the transition metal oxides such as MnO and NiO.

Figure 6:
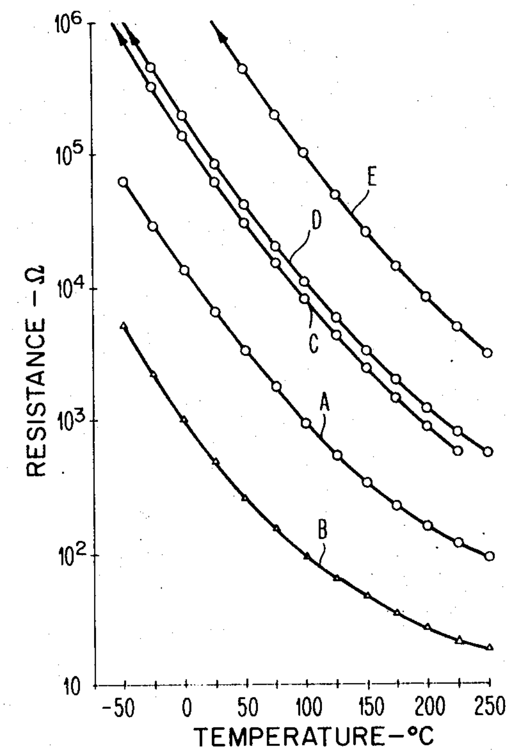
FIGURE 6 is a plot of resistance vs. ambient temperature for thermistors of different geometric configurations using different dopants fabricated according to the invention.

In FIGURE 6 the resistance vs. ambient temperature response for thermistors of various compositions and geometries is plotted. Curve A illustrates the response for an undoped .01 square. Curve B is a .01 square doped with lithium. Curve C is a .01 square doped with a ceramic composition including a ceramic component including 54 mol percent $PbZrO_3$ and 46 mol percent $PbTiO_3$ and a vitreous frit constituting 40%, by weight, of the composition. Curve D is an undoped .10 square and Curve E is an undoped 1.0 square. From the foregoing it will be observed that one can operate in a preselected resistance range to monitor a particular temperature range by varying geometry, by the addition of a dopant or both.

While the invention has been particularly shown and described with reference to the preferred embodiments thereof, it will be understood by those skilled in the art that the foregoing and other various changes in form and details may be made therein without departing from the spirit and scope of the invention.

What is claimed is:

1. In the method of forming a thermistor the steps of:
providing a material in powder form which upon firing is thermally responsive, said material consisting of only cobalt oxide;
mixing said cobalt oxide powder with an inert liquid vehicle into paste form;
applying said paste to a dielectric;
firing said paste on said dielectric at a temperature between 1,250–1,350° C. to form a thermistor element on said dielectric; and
cooling said element to room temperature.

2. The method according to claim 1 wherein said paste is fired between 1,275–1,325° C.

3. The method according to claim 1 including adding to the cobalt oxide powder 0.1–1.0 mol percent of a dopant capable of altering the resistance of said powder.

4. The method according to claim 1 further including the step of applying electrodes to said element to form said thermistor.

5. The product produced by the method of claim 1.

6. The product produced by the method of claim 2.

7. The product produced by the method of claim 3.

8. The product according to claim 7 wherein said dopant comprises a monovalent metal for lowering resistance from the group consisting of lithium and silver.

9. The product according to claim 7 wherein said dopant is a ceramic filler for raising resistance comprising a ceramic component composed of 50–60 mol percent lead zirconate and 50 mol percent lead titanate and a vitreous frit component constituting 30–60 percent, by weight, of said filler.

10. The product according to claim 7 wherein said dopant is a transition metal oxide for raising the resistance from the group consisting of MnO and NiO.

References Cited

UNITED STATES PATENTS

| | | | |
|---|---|---|---|
| 2,626,445 | 1/1953 | Albers-Schonberg. | |
| 2,633,521 | 3/1953 | Becker et al. | |
| 2,868,935 | 1/1959 | Howatt | 29—612 X |
| 2,976,505 | 3/1961 | Ichikawa | 338—22 |
| 3,316,184 | 4/1967 | Nagase et al. | |
| 3,359,632 | 12/1967 | Froemel et al. | 29—620 |
| 3,364,565 | 1/1968 | Sapoff et al. | 29—612 |

REUBEN EPSTEIN, *Primary Examiner.*

U.S. Cl. X.R.

29—612, 620; 252—512, 519, 520; 338—25